July 27, 1965  D. M. PLUNKETT  3,196,577
INSECT EXTERMINATOR
Filed April 9, 1962  2 Sheets-Sheet 1

INVENTOR.
DONALD M. PLUNKETT
BY
ATTORNEY

July 27, 1965 D. M. PLUNKETT 3,196,577
INSECT EXTERMINATOR
Filed April 9, 1962 2 Sheets-Sheet 2

INVENTOR.
DONALD M. PLUNKETT
BY
ATTORNEY

United States Patent Office
3,196,577
Patented July 27, 1965

3,196,577
INSECT EXTERMINATOR
Donald M. Plunkett, Concord Township, Delaware
County, Ohio, assignor to Dublin Enterprises, Incorporated, Dublin, Ohio, a corporation of Ohio
Filed Apr. 9, 1962, Ser. No. 186,215
4 Claims. (Cl. 43—139)

The invention disclosed herein and illustrated in the appended drawings relates generally to devices for trapping flying insects. More specifically the invention relates to devices for attracting, confining and exterminating flying insects.

Objects

One object of the present invention is to provide a device for attracting and confining flying insects which operates to exterminate the insects thus confined.

A second object of this invention is to provide a device which attracts free, flying insects from either a lighted or darkened environment.

A further object of this invention is to provide a device which effectively attracts insects which are susceptible to either optical or olefactory stimulation.

Still further objects and features of this invention will be apparent from the subjoined specification and claims, when they are considered together with the attached drawings.

Drawings

In the drawings which illustrate the invention:

Description

Figure 1:
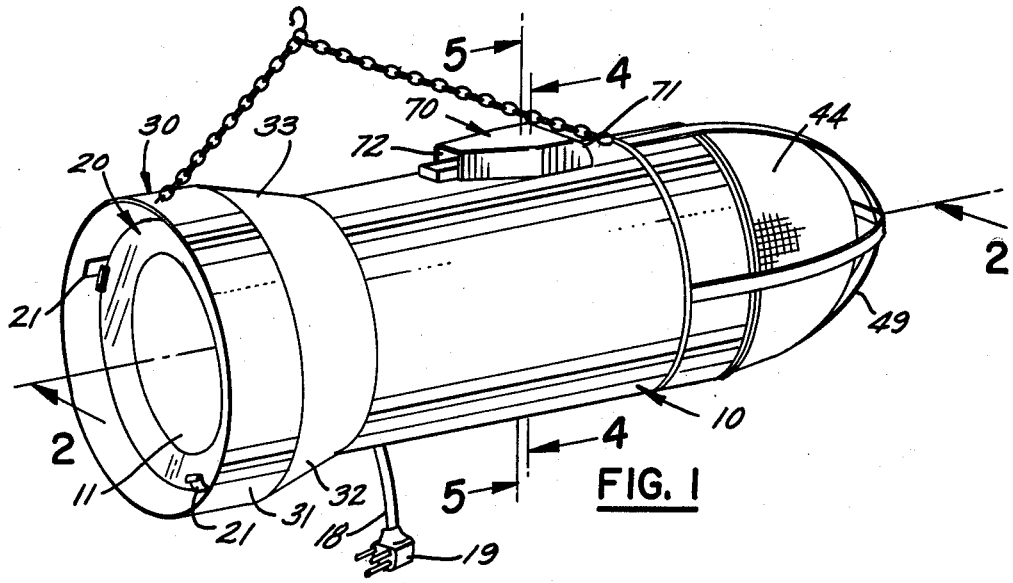
FIG. 1 is a view in perspective showing the device in position of normal operation.
Figure 2:
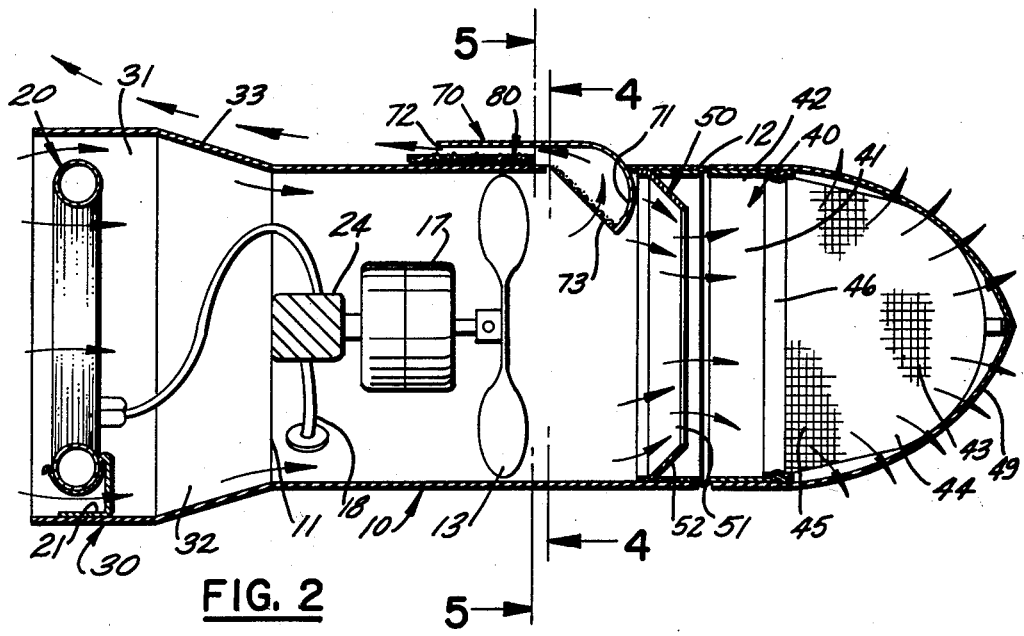
FIG. 2 is a view in vertical, longitudinal section taken along the line 2—2 of FIG. 1.

Briefly stated, the device of this invention is seen in FIGS. 1 and 2 to comprise a conduit 10, formed with an inlet opening 11 and output opening 12; means, comprising fan 13, for drawing air and flying insects through conduit 10; means, comprising lamp 20, for attracting certain insects; means, comprising inlet duct 30, for directing the flow of air and insects from lamp 20 to input opening 11; means, comprising foraminate barrier 44, for screening insects from air discharged through output opening 12; means, comprising baffle 50 for defining a retention chamber 40 adjacent barrier 44; the means, comprising a discharge baffle 50 having a frustoconical configuration for increasing the flow velocity of air and insects discharged from conduit 10 into chamber 40; means, comprising a scent duct 70, for directing a portion of the air from conduit 10 toward free insects; means, comprising an odoriferous substance 80 for imparting an insect-attracting scent to air passing through duct 70; and means 33 for deflecting air from scent duct 70 away from the vicinity of input duct 30.

Referring to the drawings for a more detailed description of the device of this invention, it will be seen in FIG. 2 that conduit 10 is formed with the general configuration of a hollow cylinder. An inlet opening 11 is located in one end of conduit 10 and the opposite end contains output opening 12.

Means comprising an air and insect impeller is provided for propelling air and insects through conduit 10. This means is provided by fan 13 which is located within conduit 10 so as to draw air, laden with airborne insects, into opening 11 and to propel such air and insects through conduit 10, toward output opening 12. Fan 13 is secured to a suitable member, such as spar 14 (FIGS. 3 and 4), which is rigidly attached at each of its opposite ends 15 and 16 to the inner wall of conduit 10.

Means comprising a light-emitting element is provided in the form of lamp 20, for attracting light responsive insects to the vicinity of inlet opening 11. Lamp 20 is retained by suitable means, such as for example spring clips 21, in position in the vicinity of inlet opening 11 of conduit 10. Power supply cable 18 is connected to a suitable source of electric power, by plug cap 19, and provides electric power for driving fan motor 17 and for energizing lamp transformer 24, thus illuminating lamp 20.

Figure 3:
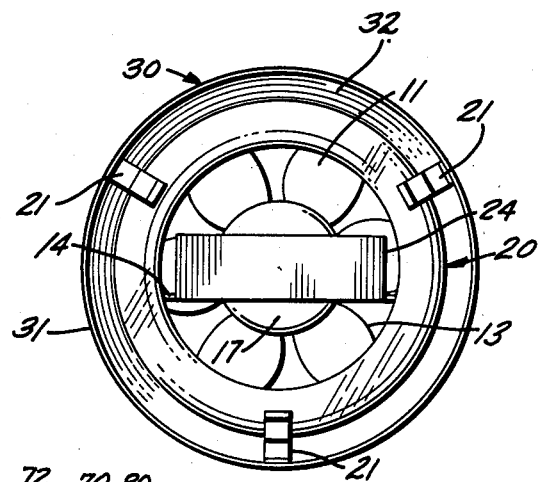
FIG. 3 is a view in elevation showing the intake end of the device of FIG. 1.
Figure 4:
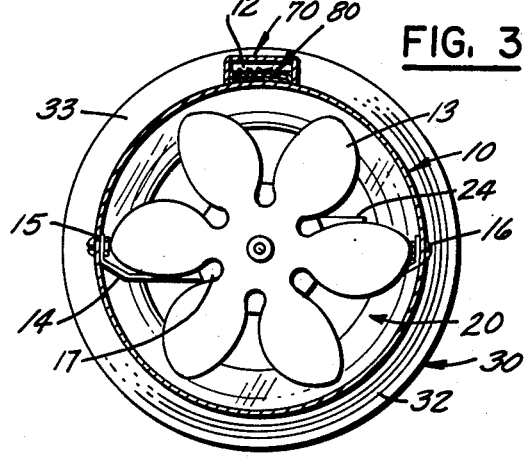
FIG. 4 is a view in cross-section taken along the line 4—4 of FIG. 1, directed toward the intake end of the device.

Means comprising inlet duct 30 for directing the flow of air and insects from the vicinity of lamp 20 through inlet opening 11 and into conduit 10. Duct 30 is preferably formed with a configuration substantially as shown in FIGS. 1, 2 and 3. Outer portion 31 is preferably in the form of a hollow cylinder having an inside diameter which is substantially greater than that of inlet opening 11 of conduit 10, and is also greater than the outside diameter of lamp 20. Experiments have demonstrated that more insects are attracted to the device if the light generated by lamp 20 is directed substantially along the line of the longitudinal axis of the device. Therefore outer portion 31 should extend along the longitudinal axis a sufficient distance to effectively prevent radiation of light from lamp 20 in directions normal to the longitudinal axis of the device. This arrangement of lamp 20 and duct 30 also makes the device directional in operation by permitting the light radiated by lamp 20 to be directed toward a particular locality which it is desired to rid of insects.

Portion 32 of duct 30 is formed with the general configuration of a hollow, truncated cone, having its opposite ends open. Portion 32 is connected along its larger, outer periphery to the inner edge of portion 31. The inner and smaller periphery of portion 32 is connected to that edge of conduit 10 which lies adjacent inlet opening 11. Portion 32 serves to connect outer portion 31 of duct 30 with the central bore of conduit 10 and to direct the flow of air and insects from the vicinity of lamp 20 into opening 11 of cylinder 10. By gradually reducing the cross-sectional area available for the flow of air and insects into conduit 10, duct portion 32 serves to increase the flow velocity of air and insects entering conduit 10 with a minimum of frictional resistance.

Means comprising insect plenum 40, for containing insects exhausted from conduit 10, is located adjacent to and is connected with output opening 12 of conduit 10.

Plenum 40 is defined by the inner surface 41 of connector sleeve 42, the inner surface 43 of foraminate barrier 44, and the rearwardly projecting surface 52 of baffle 50, as shown in FIG. 2.

Connector sleeve 42 is formed with an outer diameter which will permit the sleeve to be retained by frictional engagement within the bore of conduit 10 and be slideably removable from conduit 10 at times when desired, for the periodic removal of exterminated insects.

Barrier 44 is formed from a suitable rigid foraminate material such as wire screen, for example; having perforations of sufficient size and number to permit the passage of air under pressure from plenum 40 to the atmosphere surrounding the device, while at the same time retaining air-borne insects within plenum 40.

Figure 6:
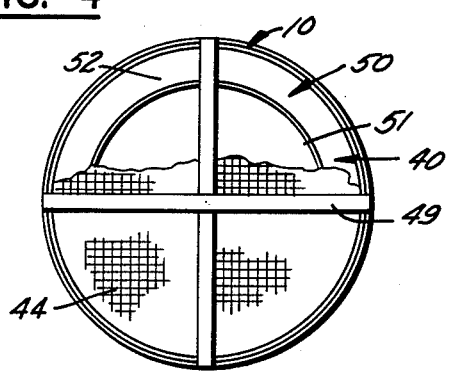
FIG. 6 is a view in elevation showing the outlet end of the device of FIG. 1, with a portion of the insect barrier removed.

Barrier 44 is formed with the generally hemispherical configuration shown in FIGS. 1, 2 and 6. This configuration of barrier 44 serves to increase the total effective area of perforations 45 which are available for the discharge of air from plenum 40, over that which would be provided by a foraminate barrier of plane configuration. By providing greater perforated area, this configuration of barrier 44 permits the movement of air from plenum 40 at substantially high velocities, even though the open area of individual perforations 45 is restricted to the extent necessary to effectively screen, from the exhausted air, insects as small as mosquitoes.

The periphery of barrier 44 is located within sleeve 42 and is secured adjacent inner wall 41 of sleeve 42 by a suitable means such as a clamping ring 46. Means, comprising guard bars 49 are secured at their opposite ends to the outer surface of sleeve 42 and are arranged adjacent the outer surface of barrier 44, for protecting barrier 44 from accidental damage.

Figure 5:
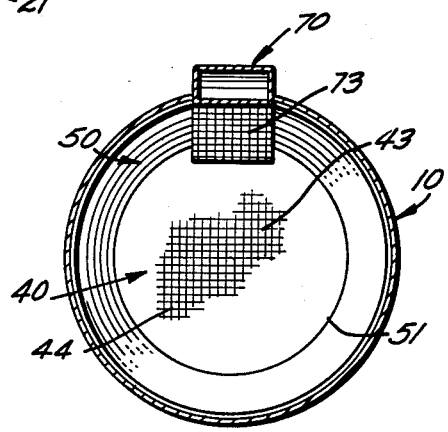
FIG. 5 is a view in cross-section taken along the line 5—5 of FIG. 1, directed toward the outlet end of the device.

Means comprising baffle 50 is formed with the general configuration shown in FIGS. 2 and 5, for increasing the flow velocity of air and insects from conduit 10 into plenum 40 and for preventing counter-circulation of insects from plenum 40 into conduit 10. Baffle 50 is substantially frustoconical in form and terminates at its rearwardly projecting end in discharge orifice 51, which is defined by the rearwardly projecting periphery of baffle 50. Baffle 50 serves to reduce the cross-sectional area of the air passage and thus to increase the flow velocity of air and insects into plenum 40. Outer wall 52 of baffle 50 serves to provide a solid forward wall for preventing the re-entry of insects into conduit 10 from plenum 40.

Means comprising scent duct 70 is provided for deflecting a portion of the air which passes through conduit 10 and directing it outside the conduit, toward an environment where free flying insects may be found and attracted. Duct 70 is formed with the general configuration seen in FIGS. 1 and 2. A portion of duct 70 projects within conduit 10 and is formed with an arcuate rear wall 71 for redirecting a portion of the air delivered by fan 13, outside of conduit 10 and in the direction from which insects will be attracted toward inlet duct 30. The forwardly directed end of duct 70 defines a scent orifice 72. A screen 73 is provided in duct 70 for preventing the escape of insects from conduit 10, through duct 70.

Means comprising an odoriferous substance 80, for attracting those insects which respond to olfactory stimulation is retained within duct 70 by any suitable means. For example, experiments have demonstrated that if a pad of absorbent paper, permeated with a thin solution of sugar syrup is positioned within duct 70, the substance will impart a scent to air exhausted from orifice 72 which will serve to attract flies to the device. Although such insects are diurnal by habit and are not noticeably attracted by the optical stimulation derived from light, they respond quite readily to the olefactory stimulation derived from this use of means 80.

Means comprising deflector 33 is provided by the outer surface of portion 32 of inlet duct 30. Deflector 33 serves to deflect scented air, which is exhausted from orifice 72, away from the vicinity of the outer opening of inlet duct 30, so as to broadcast the scented air past the intake opening of duct 30 and toward any insects which are apt to be attracted thereby to the vicinity of intake opening 11.

*Operation*

In operation, this device performs quite effectively when mounted on a post or suspended from an overhead support; so as to be positioned a few feet above the ground, in the substantially horizontal attitude seen in FIGS. 1 and 2, with the open end, designated by the numeral 11, directed toward the area which is desired to be cleared of insects.

Plug cap 19 is connected to a source of electric power suitable for driving fan motor 17 and illuminating light 20. A suitable odoriferous substance 80 is positioned within scent duct 70.

Fan 13 draws air from the surrounding atmosphere, into inlet duct 30, and past light 20 into the conical throat 32 of the inlet duct. The conical configuration of portion 32 tends to gradually restrict the cross-sectional area of the available air passage through the device and thus to increase the flow velocity of air and insects passing into conduit 10 from duct 30, with a minimum of frictional resistance to the air flow.

It has been observed that certain types of flying insects, including many nocturnal varieties, are susceptible to optical stimulation, in that they characteristically fly from darkened regions toward an attractive source of light. It is believed that the fluorescent types of electric lamps, which are now generally available, generate light having characteristics which are peculiarly attractive to many of those night-flying insects which are susceptible to optical stimulation.

Thus the light generated by fluorescent lamp 20 serves to attract many light-responsive varieties of free, night-flying insects, to lamp 20 from considerable distances. When such such insects approach the vicinity of lamp 20 they first encounter air currents, outside of inlet duct 30, which are moving in the direction of the device. The velocity at which such currents flow is necessarily low at a considerable distance from the device. Under these circumstances, the air currents serve only to facilitate the flight of an attracted insect toward its predetermined objective. As the insect approaches the device, the flow velocity of such air currents gradually increases.

As the insect reaches the vicinity of the light, the flow velocity is sufficiently high to draw the insect into inlet duct 30. Between lamp 20 and conduit 10, the flow velocity is increased, with a minimum of frictional drag, by means of the conical portion 32 of intake duct 30.

At the discharge end 12 of conduit 10, the flow of air and insects, under pressure derived from fan 13, is subjected to a further gradual reduction of the cross-sectional area of the available air passage by the discharge throat formed by conical baffle 50. Thus the air and insects enter insect plenum 40 at a relatively high velocity, and the insects collide with barrier 44 at substantially the same velocity while the air is exhausted through perforations 45 of barrier 44.

The hemispherical configuration of foraminous barrier 44 operates to spread the jet of air and insects which issues from opening 51, since it affords an area greater than that of opening 51 for ultimate discharge of the air from the machine. This reaction of air currents within the device operates to distribute air-borne insects over a wider area on inner surface 43 of barrier 44.

One result of this action is to distribute the points of initial impact of various insects over a broader area on surface 43 of barrier 44, and thereby minimize the possibility of clogging openings 45 of barrier 44 which would reduce the effectiveness of the device.

A second result of this reaction of air currents is that a secondary air circulation pattern is established within plenum 40. A portion of the air contained in chamber 40 is thus moved circumferentially along surface 43 toward sleeve 42.

Many insects are carried by this secondary air circulation from the point of initial impact on screen 44 toward that portion of plenum 40 which is defined by sleeve 42. Since this air is moving from a relatively confined area at the apex of screen 44, to a less confined area beyond the periphery of the hemispheric screen, the rate of flow decreases as the retained air approaches sleeve 42.

Since the minimum velocity of the secondary circulation thus occurs in the region defined by sleeve 42, those insects which were exterminated or immobilized by initial impact with screen 44 are ultimately deposited within sleeve 42 and gravitate to the lower portion of the internal chamber defined by that member.

Particularly hardy insects which are still able to fly after the initial impact with screen 44 are also moved, by the secondary circulation, toward sleeve 42. At some point during that movement, the insect may attempt to fly away from screen 44 toward the center of chamber 40. He then encounters the jet of air which issues, at a relatively high flow velocity, from opening 51. The insect is then propelled by the air jet toward an additional impact with barrier 44.

Of course this cycle is repeated, with respect to individual insects until successive impacts with screen 44 have effectively immobilized the insect. It has been observed in the operation of this device that the hardiest insects are subjected to repeated impacts with barrier 44, with the result that each insect captured by the device is ultimately rendered incapable of voluntary locomotion and is therefore effectively exterminated by the device.

Experiments indicate that many varieties of flying insects, commonly found in the United States, are either insensitive to optical stimulation or are only passively attracted toward light-emitting devices. Among these types are certain insects which are characteristically diurnal in their habits, being most active during the daylight hours.

It has been learned that many such diurnal varieties of insects are susceptible to olfactory stimulation, in the sense that they characteristically fly toward the direction from which certain air-borne odors are carried to them. While different varieties of odor-sensitive insects have been found to respond most positively to different odors, experiments indicate that most varieties are attracted by the scent of sweet substances.

Although certain varieties of insects react more rapidly to the scent of decayed or putrid substances, most of the same varieties may also be lured by a sweet scent. Since a sweet scent has the added advantage of being relatively inoffensive to human beings, it has been found most satisfactory for use in the device of this invention.

Experiments have demonstrated that a solution of sucrose, or ordinary household sugar, containing equal parts of sugar and water, by weight, comprises an odoriferous substance which will produce the desired result when used in the subject device. A pad of absorbent material, such as for example a folded pad of paper, is impregnated with such a sugar solution. The impregnated pad 80 is then positioned within scent duct 70 in the manner shown in FIGS. 2 and 4.

A portion of the air delivered by fan 13 (FIG. 2) then enters scent duct 70 through screen 73, which serves to exclude air-borne insects from duct 70 and prevent their escape from conduit 10.

The arcuate configuration of rear wall 71 of scent duct 70 serves to change the direction of flow of air passing through duct 70 and redirect such air generally toward an area in the environment of the device from which insects may be attracted, by olfactory means, to inlet duct 30.

Air from fan 13 which is thus directed through duct 70 passes over odoriferous material 80, which is described above, and absorbs from such material a scent which is attractive to certain insects. The scented air is then discharged from duct 70 through opening 72, in the general direction of free insect pests which it is desired to attract and exterminate.

To avoid immediately drawing all of such scented air back into inlet duct 30 and discharging it all through the output orifice 51, duct 70 is so positioned that outer surface 33 of portion 32 of inlet duct 30 (FIGS. 2 and 4) serves to deflect the scented air discharged from opening 72, away from the opening of inlet duct 30 in a manner which results in broadcasting the scented air a considerable distance beyond the region from which air is drawn positively into duct 30.

An insect attracted by the scented air from duct 70 will fly toward the point from which the scented air issued. Due to the fact that the scented air is broadcast, in the manner just described, by deflector surface 33, an attracted insect is unable to follow the scent directly to its source, although it is attracted toward the device, generally.

As the insect approaches the device, it encounters the currents of air, previously described, which move toward and into inlet duct 30. The odor-sensitive insect is then drawn into the device in substantially the manner previously described with reference to light-sensitive varieties of insect pests.

Since both light-attracted and scent-attracted varieties of insects are found abroad during either the daylight or after-dark hours, it has been found advantageous to employ both light and scent means for attracting insect pests to the device, regardless of the time of day or night when the device is used. When the device is used in this manner it has proven equally effective at attracting and exterminating insects either from a lighted or darkened environment, at any time of the day or night.

It is to be understood that the above embodiment of this invention is shown and described for purposes of illustration only. Various changes may be made therein without departing from the spirit and scope of the invention.

The invention claimed is:

1. A device for attracting, confining and exterminating insects, said device comprising in combination: a cylindrical conduit, formed with an inlet opening, an output opening and a central bore; a fan positioned within said conduit; means, comprising a light located adjacent said inlet opening; means for operating said fan and said light; an inlet duct, formed with an outer cylindrical portion, radially disposed about said lamp, and an inner portion, defining a conical throat, said inner portion connecting said outer portion with said inlet opening; a discharge baffle having a frustoconical configuration, located adjacent said output opening, said baffle defining a discharge orifice; a rigid, foraminate barrier, formed with a hemispherical configuration and removably connected to said output opening; a scent duct located outside of said conduit and in communication with said central bore, said scent duct being provided with a rear wall having an arcuate configuration; a deflector surface spaced between said scent duct and said outer cylindrical portion of said inlet duct.

2. The device of claim 1 wherein an olfactory stimulant is contained within said scent duct.

3. A device for attracting, confining and exterminating insects, said device comprising in combination: a cylindrical conduit, formed with an inlet opening, an output opening and a central bore; a fan positioned within said conduit; means for rotating said fan; a fluorescent lamp, positioned in the vicinity of said inlet opening; means for illuminating said lamp; an inlet duct, formed with an outer cylindrical portion, radially disposed about said lamp, said inlet duct being further formed with an inner portion defining a conical throat, said conical throat connecting said inlet duct to said inlet opening; a discharge baffle, having a frustoconical configuration, located adjacent said output opening, said baffle defining a discharge orifice of restricted cross-sectional area; a rigid, foraminate barrier, formed with a hemispherical configuration, said foraminate barrier being removably connected to said conduit at said output opening; a scent duct located outside of said conduit and in communication with said central bore, said scent duct being provided with a rear wall having an arcuate configuration; a deflector surface spaced between said scent duct and said outer cylindrical portion of said inlet duct.

4. The device of claim 3, wherein an olfactory stimulant is contained within said scent duct.

References Cited by the Examiner

UNITED STATES PATENTS

| | | | |
|---|---|---|---|
| 1,071,620 | 8/13 | Kingsland | 43—139 |
| 1,313,203 | 8/19 | Pakeman | 43—139 |
| 2,694,879 | 11/54 | Stoll | 43—139 |
| 2,739,411 | 3/56 | Chapman et al. | 43—139 |
| 2,893,161 | 7/59 | Reid | 43—139 |
| 3,041,773 | 7/62 | Gagliano | 43—139 |
| 3,058,257 | 10/62 | Brophy et al. | 43—139 |

FOREIGN PATENTS

| | | |
|---|---|---|
| 717,903 | 10/31 | France. |
| 665,247 | 9/38 | Germany. |

SAMUEL KOREN, *Primary Examiner.*